Patented Dec. 10, 1946

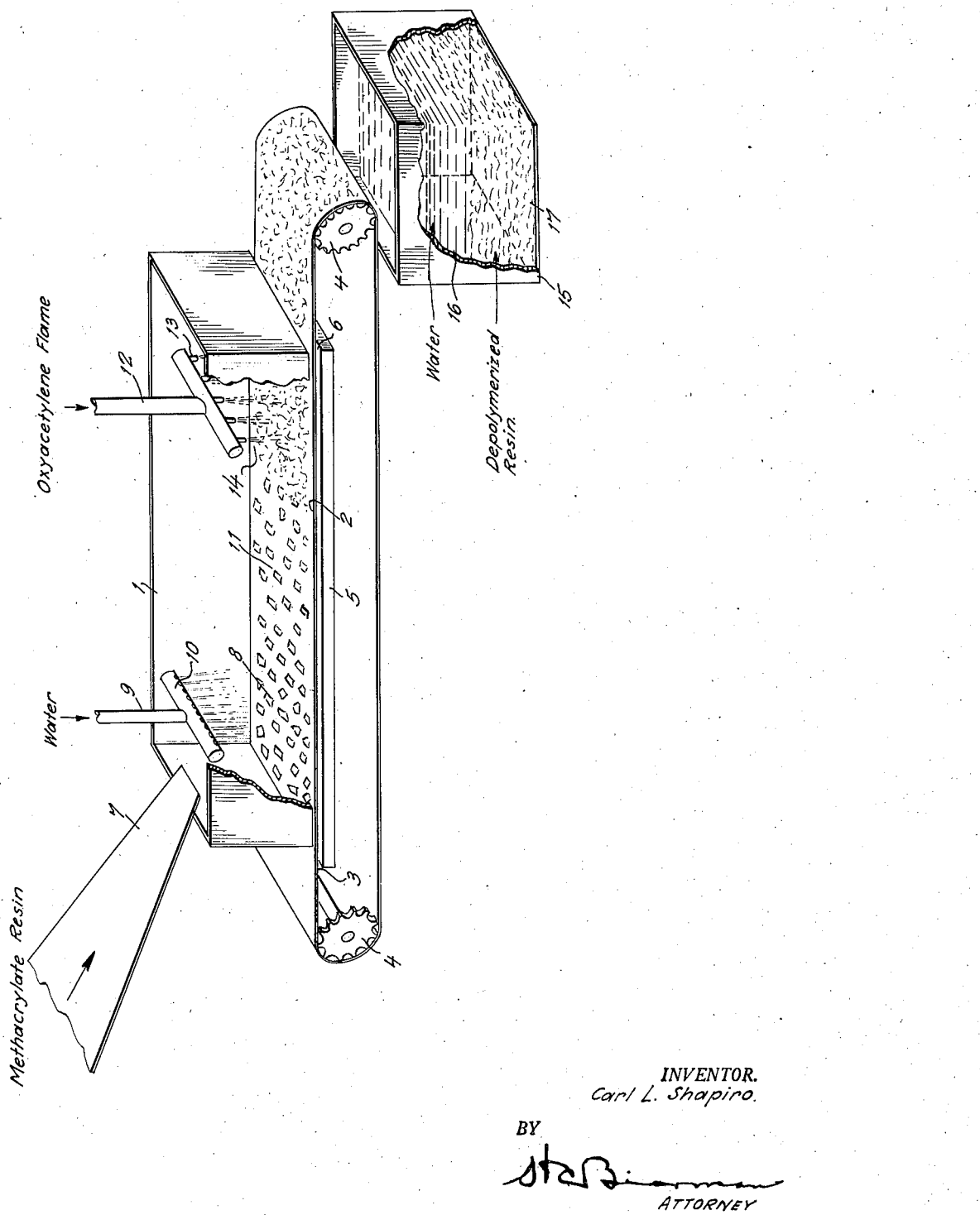

2,412,296

UNITED STATES PATENT OFFICE 2,412,296

METHOD OF AND APPARATUS FOR DEPOLYMERIZING ACRYLATE RESINS

Carl L. Shapiro, Beaver Falls, Pa.

Application April 3, 1944, Serial No. 529,390

7 Claims. (Cl. 260—486)

The present invention is directed to the treatment of acrylate resins such as those made from methacrylic acid and esters thereof.

Resins of the acrylate type have been in use for some years and they find a considerable application in molding of various articles, usually by injection methods. In the course of such manufacture there is a considerable amount of waste acrylate resin which is an important factor in determining the cost of the molded article. It has been attempted to recover the same by various methods, among which is the treatment of the acrylate resin in order to decompose and depolymerize the same to form the monomer. It was accomplished by placing the resin in a suitable vessel and heating it to a temperature usually between 300° and 400° C., whereby decomposition took place and dry distillation was effected. The condensate from the process was condensed and consisted to a large extent of the monomer.

However, this process was not capable of commercial application for various reasons. The monomer was quite impure and contained various colored substances which were most difficult to remove. Also, some of the substances formed in the decomposition operation and contained in the monomer tended to interfere with the further utilization thereof in the making of acrylate resins.

In order to overcome this, it was proposed to treat the relatively impure monomer in order to further purify the same. This was accomplished by distillation with steam of the monomer and the condensing of the distilled product. However, it required rather close control of the operation, together with a considerable amount of equipment in order to fractionate the desired monomer from other substances present. Also, various difficulties arise where the acrylate resin contains certain modifying agents which tend to contaminate the monomer after formation.

The present invention is intended and adapted to overcome the difficulties and disadvantages of prior methods and to provide a method of depolymerizing acrylate resins which is simple and effective and which is capable of quickly depolymerizing said resins with a minimum of labor and apparatus.

It is well known that acrylate resins begin to dissociate when heated to a temperature of about 200° C., and that the dissociation, if allowed to proceed for a sufficient length of time, will produce the monomer. At higher temperatures, say 300°–400° C., this action takes place with a considerable velocity. Therefore, prior processes were dependent upon the dissociation, volatilization of the product, and condensation thereof. The present invention also subjects the acrylate resin to temperatures above the dissociation point for formation of the monomer from the resinified mass. However, it differs essentially in that the temperature used in the treatment is quite high, being usually above 400° C. and as high as 1000° C. According to prior information, such temperatures would necessarily completely decompose the resin to form useless end products.

In accordance with the present invention, the time of treatment of the acrylate resin is extremely short, usually a matter of a small number of seconds. The heating of the resin is intense for the extremely short period of time, and the time and temperature are so correlated as to decompose the resin to form a liquid product, that is, a product which after it is cooled is in the liquid state. This is accomplished without volatilization of any substantial amount of the end products, even though the temperatures used are far above the boiling points thereof.

The invention consists essentially in providing a trough or other container, having at the bottom thereof a moving conveyor or belt. The acrylate resin in the desired state of subdivision, which may be irregular-shaped pieces of relatively small size, is fed into the intake end of the trough, that is, at the point where the traveling conveyor enters the apparatus. A layer of resin is so placed on the conveyor and water is sprayed thereon so as to cover the layer of resin. As the mixture of water and resin travels towards the opposite end of the trough, there is provided a direct flame of high intensity, such as an oxy-acetylene type of flame. The flame cuts through the water and acts intensively on the resin, depolymerizing the same, and immediately upon the reaction taking place the mixture on the conveyor is moved out of the zone of reaction with very little vaporization of either the water or the depolymerized product. The mixture is then placed in a suitable vessel where it is allowed to settle to form two layers, one of which is the liquid depolymerized resin.

The process may be controlled so as to give any desired mixture of liquid products. It is possible to control the time and temperature of the reaction to give the monomer as the principal or sole reaction product. However, for the purpose of the present invention it is not necessary nor even desirable in many cases to decompose the resin to the monomer. In a preferred operation of the invention, the depolymerization is caused to take place to form a mixture of polymers of low molecular weight, the mixture being liquid in character. Usually such polymers contain from 2 to 5 acrylate radicals in the molecule. There may also be present molecules of a higher molecular weight which are semi-solid in character. Because of the presence of the lower liquid polymers, such higher polymers are dissolved therein and a liquid product results. Such a liquid mixture has a boiling point above the boiling point of water, and this facilitates the operation in that the tendency to volatilize under the high temperatures used is minimized. Such a product has the further advantage that in order to transform the same into an acrylate resin, the polymerization reaction takes place much more readily than with the monomer, with less reagent and in a shorter time.

The products of the present invention may be directly mixed with acrylate resin and the mixture subjected to molding. Also, it is possible to mix the products of the present invention with the scrap acrylate resin which in itself is no longer useable for further molding operations because of the chemical changes taking place during the molding process. Such a mixture has substantially the qualities of an unmolded multiple acrylate resin. Or, the product may be mixed with benzoyl peroxide or the like and subjected to polymerization to form a molding composition. It may be made in any desired form, such as rods, sheets, or the like, and the same subdivided to give granules of the desired size.

In the accompanying drawing, constituting a part hereof, and in which like reference characters indicate like parts, the single figure is a perspective view of an apparatus particularly adapted for depolymerizing acrylate resins to form liquid polymers in accordance with the present invention.

There is provided a trough 1, the bottom of which consists of a travelling conveyor or belt 2, which is held in place by a plate 5 underlying trough 1. Belt 2 is continuous and is rotated around rollers 4. The belt moves from the incoming or intake end 3 of the trough, to the discharge end 6.

A methacrylate resin in relatively small sized pieces is introduced through funnel 7 at end 3 of trough 1, forming a layer 8 on the moving belt. Through pipe 9 water is introduced and distributed by spray 10 over material 8. The amount of water is sufficient to thoroughly wet the particles of resin and may be sufficient to form a water layer thereover, as shown at 11. Through a tube 12 there is introduced a mixture of oxygen and acetylene, forming a series of frames 13 projecting downwardly and impinging upon the layer 11. At this point depolymerization takes place and the mixture of depolymerized resin and water in the liquid state passes out through 6 and into container 15. The material settles therein, forming an upper layer 16 of water and a lower layer 17 of liquid depolymerized product.

Incorporated in the water in pipe 9 may be a detergent or wetting agent which will form an emulsion with the liquid monomer or liquid polymer after it is depolymerized. The liquid may subsequently be either separated mechanically from the emulsion or polymerized in the emulsion to its polymers.

The invention may be operated with acrylate resins which have been mixed with other substances, such as plasticizers, other resins, stabilizers, and the like. Usually such additional substances do not interfere with the operation of the process and most of them are not unduly decomposed in the operation. However, if such decomposition does occur, then a simple distillation operation will remove the liquid polymers and any monomer which may be present from the additional substances. However, the heating step is so short that usually additions contained in acrylate resins remain in their initial form. Because of the short time of treatment, there is very little if any discoloration in the liquid products. In any case, such discoloration may be removed by usual color-absorbing materials.

Although the invention has been described by means of a single specific example of the operation thereof, it will be apparent to those skilled in the art that various changes in the details of the invention may be made within the scope of the invention. For instance, the apparatus need not be strictly in the shape of a trough, but other equivalent forms may be used. It is even possible to dispense with a trough as such and construct the traveling conveyor in such a manner that it performs the functions of the trough. The resin may be introduced into the apparatus in the cold state, but if desired some heating thereof may be performed in order to facilitate and shorten the depolymerization reaction by the direct flame. In place of water, other liquids of suitable character or aqueous solutions may be used. These and other changes may be made in the details of the invention within the spirit thereof, and the invention is to be broadly construed and not to be limited except by the character of the claims appended hereto.

What I claim is:

1. A method of depolymerizing acrylate resins which comprises wetting said resin with an aqueous liquid, subjecting the same to the action of a direct flame of relatively high temperature above 400° C. for a short time to decompose said resin to a liquid, and rapidly removing said product from the zone of reaction to prevent volatilization of said product.

2. A method of depolymerizing acrylate resins which comprises subdividing said resin to provide particles of relatively small size, wetting said resin with an aqueous liquid, subjecting the same to the action of a direct flame of relatively high temperature above 400° C. for a short time to decompose said resin to a liquid, and rapidly removing said product from the zone of reaction to prevent volatilization of said product.

3. A method of depolymerizing acrylate resins which comprises placing said resin on a travelling conveyor, wetting said resin with an aqueous liquid, subjecting the same to the action of a direct flame of relatively high temperature above 400° C. for a short time to decompose said resin to a liquid, and rapidly removing said product from the zone of reaction to prevent volatilization of said product.

4. A method of depolymerizing acrylate resins which comprises placing said resin on a traveling conveyor, wetting said resin with an aqueous liquid, passing said mixture under a gas flame and during said passage subjecting the same to the action of said direct flame of relatively high temperature above 400° C. for a short time to decompose said resin to a liquid, and rapidly removing said product from the zone of reaction to prevent volatilization of said product.

5. A method of depolymerizing acrylate resins which comprises wetting said resin with an aqueous liquid, subjecting the same to the action of a direct flame of relatively high temperature above 400° C. for a short time to decompose said resin to a liquid, and rapidly removing said product from the zone of reaction to prevent volatilization of said product, pouring said product into a vessel, allowing the same to stand to form an aqueous layer and a liquid acrylate layer, and recovering the latter.

6. A method of depolymerizing acrylate resins which comprises wetting said resin with an aqueous liquid, providing a trough, the bottom of which is a traveling conveyor, placing said resin on the incoming end of said conveyor, subjecting the same to the action of a direct flame of relatively high temperature above 400° C. for a short time to decompose said resin to a liquid, said flame being at the discharge end of said conveyor, and rapidly removing said product from the zone of reaction to prevent volatilization of said product.

7. A method of depolymerizing acrylate resins which comprises subdividing said resin to provide particles of relatively small size, wetting said resin with an aqueous liquid, said liquid having a wetting agent dissolved therein, subjecting the same to the action of a direct flame of relatively high temperature above 400° C. for a short time to decompose said resin to a liquid, and rapidly removing said product from the zone of reaction to prevent volatilization of said product.

CARL L. SHAPIRO.